United States Patent [19]
Nakabayashi et al.

[11] Patent Number: 5,812,946
[45] Date of Patent: Sep. 22, 1998

[54] CORDLESS TELEPHONE SYSTEM CAPABLE OF TRANSMITTING ABBREVIATED NUMBER INFORMATION BETWEEN BASE STATION AND PERSONAL STATION AND METHOD THEREFOR

[75] Inventors: Sumie Nakabayashi; Toshiaki Murai, both of Yokohama, Japan

[73] Assignee: Hitachi, Ltd., Tokyo, Japan

[21] Appl. No.: 515,242

[22] Filed: Aug. 15, 1995

[30] Foreign Application Priority Data

Sep. 1, 1994 [JP] Japan .................................. 6-208418

[51] Int. Cl.⁶ .................................................. H04M 1/27
[52] U.S. Cl. ........................ 455/426; 455/564; 455/418; 379/355
[58] Field of Search ................................ 379/61, 58, 355

[56] References Cited

U.S. PATENT DOCUMENTS

| | | | |
|---|---|---|---|
| 5,068,889 | 11/1991 | Yamashita | 379/355 |
| 5,097,502 | 3/1992 | Suzuki et al. | 379/355 |
| 5,301,223 | 4/1994 | Amadon et al. | 379/58 |

FOREIGN PATENT DOCUMENTS 2-174448 of 0000 Japan .
5-316033 of 0000 Japan .

OTHER PUBLICATIONS

Personal Handy Phone System RCR Standard, Version 1 Revision–1, pp. 46–49, Mar. 3, 1995.
Personal Handy Phone System RCR Standard, Version 1 issued Dec. 20, 1993, pp. 46–49, 68–71, 366–367, 162–165, 314–315, 324–331 (Provided in English).

*Primary Examiner*—Dwayne Bost
*Assistant Examiner*—Myron K. Wyche
*Attorney, Agent, or Firm*—Fay Sharpe Beall Fagan Minnich & McKee

[57] ABSTRACT

A cordless telephone system includes one base station and at least one personal station. Each station includes an abbreviated dial memory for storing abbreviated dial data, a control unit for controlling the telecommunication device, an abbreviated dial transfer unit for selectively transmitting in radio the abbreviated dial data stored in the abbreviated dial memory to another telecommunication device, and a unit for receiving abbreviated dial data transmitted from another telecommunication device and writing the abbreviated dial data into the abbreviated dial memory. By using an empty channel of communication in progress or a control channel which can be freely used by a user, abbreviated dial data are transferred between stations.

4 Claims, 11 Drawing Sheets

FIG.4

| 00 | 0451811221 | 0 |
|---|---|---|
| 01 | 0451811241 | 1 |
| 02 | 0331811101 | 1 |
|  |  |  |
| 99 |  |  |

ABBREVIATED NUMBER | TELEPHONE NUMBER | REWRITING INHIBIT FLAG
0 : ALLOWED
1 : NOT ALLOWED

| R | SS | PR | UW | CI | SACCH | I (SPEECH DATA) | CRC |
|---|----|----|----|----|----|----|----|
| 4 | 2 | 6 | 16 | 4 | 16 | 160 | 16 |

R : RAMP TIME
PR : PREAMBLE
SS : START SYMBOL
UW : UNIQUE WORD
CI : CHANNEL IDENTIFIER
CRC : CHECK CODE

FIG.7C

| 8BITS | 8BITS |                    |
|-------|-------|--------------------|
| #     | S     | START CODE         |
| 0     | 0     | ABBREVIATED NUMBER |
| 0     | 4     | ⎫                  |
| 5     | 8     | ⎬ TELEPHONE NUMBER |
| 8     | 1     | ⎪                  |
| 1     | 2     | ⎭                  |
| 2     | 1     |                    |
| #     | E     | END CODE           |

FIG.7D

| 4BITS | 4BITS | 4BITS | 4BITS |                                     |
|-------|-------|-------|-------|-------------------------------------|
| +     | 4     | 0     | 0     | START CODE (+) AND ABBREVIATED NUMBER |
| 0     | 1     | 5     | 8     | ⎫ TELEPHONE NUMBER                  |
| 8     | 1     | 1     | 2     | ⎭                                   |
| 2     | —     |       |       | TELEPHONE NUMBER AND END CODE (−)   |

FIG.9A

| R | SS | I (USCCH) | UW | CI | CALLED STATION IDENTIFI- CATION CODE | CALLING STATION IDENTIFI- CATION CODE | I(USCCH) | CRC |
|---|---|---|---|---|---|---|---|---|
| 4 | 2 | 62 | 32 | 4 | 42 | 28 | 34 | 16 |

FIG.9B

| R | SS | I (USCCH) | UW | CI | CALLING STATION IDENTIFI- CATION CODE | CALLED STATION IDENTIFI- CATION CODE | I(USCCH) | CRC |
|---|---|---|---|---|---|---|---|---|
| 4 | 2 | 62 | 32 | 4 | 42 | 28 | 34 | 16 |

R : RAMP TIME
PR : PREAMBLE
SS : START SYMBOL
UW : UNIQUE WORD
CI : CHANNEL IDENTIFIER
CRC : CHECK CODE

CORDLESS TELEPHONE SYSTEM CAPABLE OF TRANSMITTING ABBREVIATED NUMBER INFORMATION BETWEEN BASE STATION AND PERSONAL STATION AND METHOD THEREFOR

BACKGROUND OF THE INVENTION

1. Field of the Invention

The present invention relates to telecommunication terminals, such as telephone stations and facsimile devices, for which telephone numbers are registered beforehand and a desired telephone number is selected for telecommunication out of registered telephone numbers. In particular, the present invention relates to a cordless telephone system including a base station connected to a telecommunication line and at least one personal station connected in radio to the base station.

2. Description of the Related Art

Conventionally, in the case if a plurality of telephone numbers registered in a memory dial comprising an abbreviated number, one-touch dial, electronic telephone directory or the like of a telecomunication terminal such as a telephone station were to be registered into another telecommunication terminal, operation for registering the telephone numbers again is repeated without using the contents registered in the memory dial. By the way, the memory dial is a kind of function provided in telecommunication terminals to register telephone numbers and effect calling by means of a more simple operation. In recent years, the customers of New Common Carrier (NCC) such as Japan Telecom Co., Ltd., DDI Corp. and Teleway Japan Corp. have increased. Typically, a four digit number is added to an ordinary telephone number. Therefore, it is not rare that the telephone number reaches fourteen digits. Due to such a circumstance, the abbreviated number or the like also generates a great effect.

As techniques for transferring memory dial data between telephone stations, there are techniques as described below. In JP-A-2-174448, there is disclosed a technique for connecting two telephone stations via a cable and transferring memory dial data of one of the two telephone stations to a memory of the other of the two telephone stations.

In this technique, data terminals for cable connection must be provided in each telephone station. Therefore, this technique is not suitable for cordless telephone stations of which reduction in size and cost is required. Furthermore, in the case where two telephone stations are disposed at a long distance, connection via a cable is difficult and data cannot be transferred.

In JP-A-5-316033, there is disclosed a technique for transferring in radio memory data between a base station and a personal station of a cordless telephone station. According to this technique, however, data transfer between the base station and the personal station is effected automatically for the purpose of data backup and the user cannot select data to be transferred.

In JP-A-5-95398 as well, there is disclosed a technique for effecting data transfer between telephone stations. However, this is a technique applied between a fixed telephone device and a portable radio telephone.

In the cordless telephone, the number of personal stations connected to one base station is in a range of one to five and the number of cases of memory dial registration sometimes amounts to several tens. From the property perspective of a cordless telephone system, however, users are usually the same person or persons in the same environment no matter how many personal stations are connected to one base station. Thus it is typically necessary to register the same abbreviated numbers and the like in the base station and all of the personal stations. Furthermore, when it becomes necessary to amend a registered number, all registered contents of the base station and personal stations must be amended. Therefore, registration or amendment of registered contents corresponding to the number of stations must be effected. A large amount of time and labor is needed for registration and amendment work.

SUMMARY OF THE INVENTION

In view of the above described problems, the present invention was made. An object of the present invention is to provide a small-sized inexpensive telecommunication terminal for a cordless telephone station for facilitating registration and editing of memory dial data.

In order to achieve the above described object, a telecommunication device capable of calling by using a telephone number stored in an abbreviatd dial storing means includes means for selectively transmitting by radio contents of the abbreviated dial storing means to other telecommunication devices, and means for receiving telephone number data from another telecommunication device and writing in radio the telephone number data in the abbreviated dial storing means.

Use of a cordless telephone system according to the present invention configured as heretofore described makes it possible to transfer memory dial data between telephone stations each having a memory dial function such as abbreviated numbers while maintaining a small size and low cost, to eliminate conventional operation for inputting and amending dial data using individual setting and time required for the conventional operation, and register memory dial data rapidly.

BRIEF DESCRIPTION OF THE DRAWINGS

FIG. 4 is a diagram showing the structure of abbreviated dial data according to the present invention;

FIGS. 7C and 7D are diagrams showing examples of coding of abbreviated dial data;

FIGS. 9A and 9B are diagrams showing the slot configuration of uplink and downlink USCCHs (User Specific Control Channels), respectively;

DESCRIPTION OF THE PREFERRED EMBODIMENTS

The case where data transmission is performed between a base station and a personal station in accordance with personal handy-phone system RCR standard (RCR STD-28) in a cordless telephone system including one base station and at least one personal station will hereafter be described.

Figure 1:
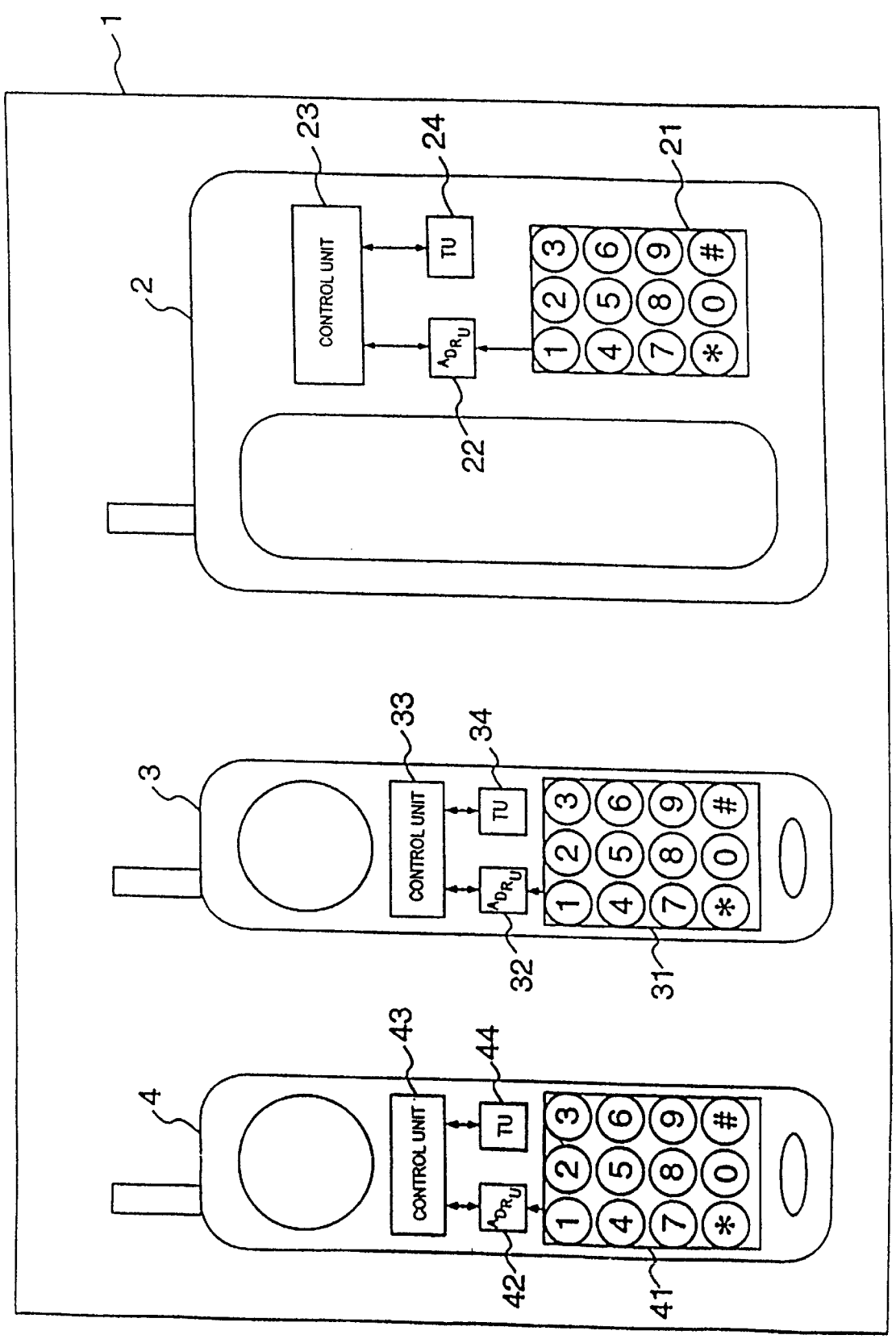
FIG. 1 is a concept diagram showing the configuration of a digital cordless telephone system according to the present invention.

FIG. 1 is a diagram showing one embodiment of the configuration of a cordless telephone system according to the present invention. The cordless telephone system 1 according to the present invention is formed by a base station 2 and two personal stations, such as a first personal station 3 and a second personal station 4.

The base station 2 includes a keypad 21, an abbreviated dial registration unit (ADRV) 22 for storing association of abbreviated numbers inputted from the keypad with telephone numbers, a control unit 23 for controlling the base station, and a transfer unit (TU) 24 capable of transmitting to and receiving for transferring contents stored in the abbreviated dial registration unit 22 to a personal station, and for receiving contents stored in an abbreviated dial registration unit of a personal station and for storing the contents in the abbreviated dial registration unit 22.

The first personal station 3 includes a keypad 31, an abbreviated dial registration unit (ADRV) 32, a control unit 33 for controlling the personal station, and a transfer unit (TU) 34 capable of transmitting and receiving for transferring contents stored in the abbreviated dial registration unit (ADRV) 32 to the base station 2, and for receiving contents stored in the abbreviated dial registration unit 22 of the base station and storing the contents in the abbreviated dial registration unit 32 of the personal station. The second personal station 4 has the same configuration as the first personal station 3 has.

The above described data transfer operation conducted between the base station 2 and the first personal station 3 or the second personal station 4 can be similarly conducted between the first personal station 3 and the second personal station 4 in the same way. Even if additional personal stations are installed, the additional personal stations can be provided with similar functions.

Figure 2:
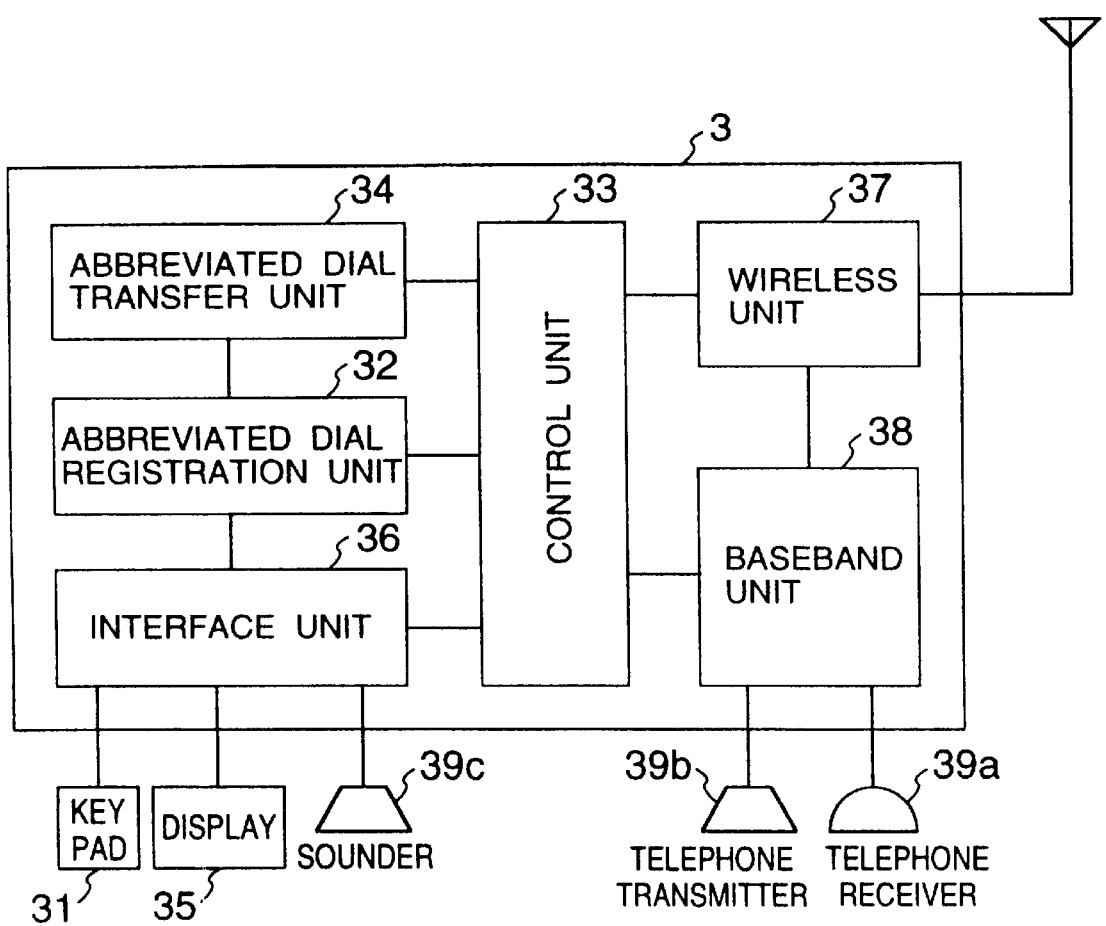
FIG. 2 is a block diagram showing the configuration of a personal station of a digital cordless telephone system according to the present invention.

The data transfer operation will now be explained in detail. FIG. 2 is a block diagram showing a further detailed configuration of a personal station of the cordless telephone system. The personal station 3 includes the keypad 31 for performing key inputting, the abbreviated dial registration unit 32, the control unit 33, the abbreviated dial transfer unit 34, a display unit 35 for performing a display, an interface unit 36, a wireless unit 37, a baseband unit 38, a telephone receiver 39a, a telephone transmitter 39b, and a sounder 39c. First of all, in the case where abbreviated dial is to be registered in the personal station, a code for registration, such as #+* +an abbreviated number (00–99) +a telephone number +##, is inputted via the keypad 31. ("+"is not inputted.) This input code is taken in via the interface unit 36, and abbreviated numbers and telephone numbers are stored in the abbreviated dial registration unit 32 so as to be associated.

Figure 3:
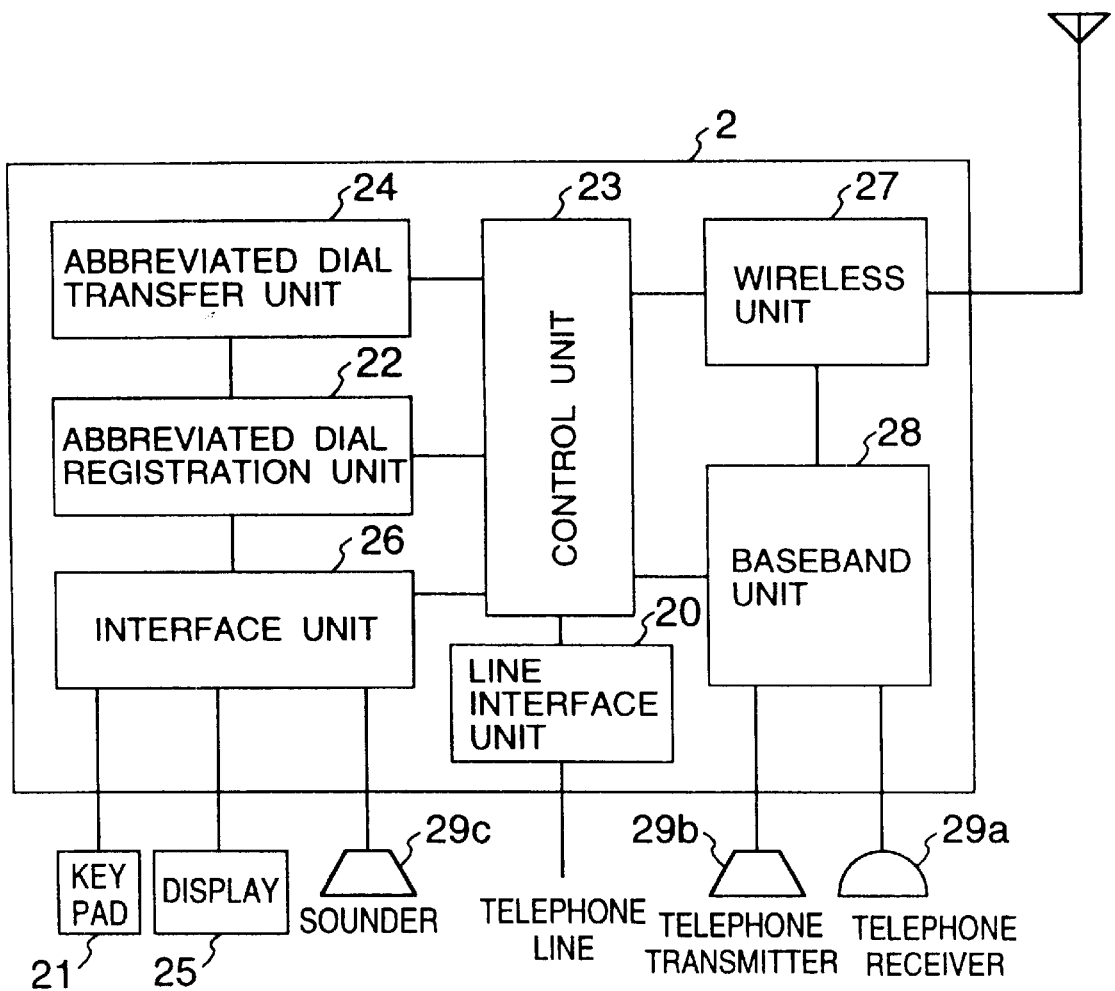
FIG. 3 is a block diagram showing the configuration of a base station of a digital cordless telephone system according to the present invention.

FIG. 3 is a block diagram of a base station 2 of the cordless telephone system. The base station 2 has a configuration similar to that of the personal station 3. The base station 2 includes the keypad 21 for performing key inputting, the abbreviated dial registration unit 22, the control unit 23, the abbreviated dial transfer unit 24, a display unit 25 for performing a display, an interface unit 26, a wireless unit 27, a baseband unit 28, a telephone receiver 29a, a telephone transmitter 29b, and a sounder 29c. Furthermore, the base station 2 includes a telephone line interface unit 20. Abbreviated dial registering is possible for the base station 2 as well by using a procedure similar to that of the personal station 3 described above. In order to prevent registered abbreviated dial data from being rewritten freely by data transferred from the outside, it may be specified for each abbreviated number whether rewriting is possible. This information indicating whether rewriting is possible for each abbreviated number is also inputted from the keypad.

FIG. 4 shows an example of configuration of abbreviated dial data stored in the abbreviated dial registration unit 22. The abbreviated dial data is formed by a abbreviated number, telephone number, and information indicating whether rewriting is possible.

The method for transferring abbreviated dial data from the personal station 3 to the base station 2 will now be described.

Figure 5:
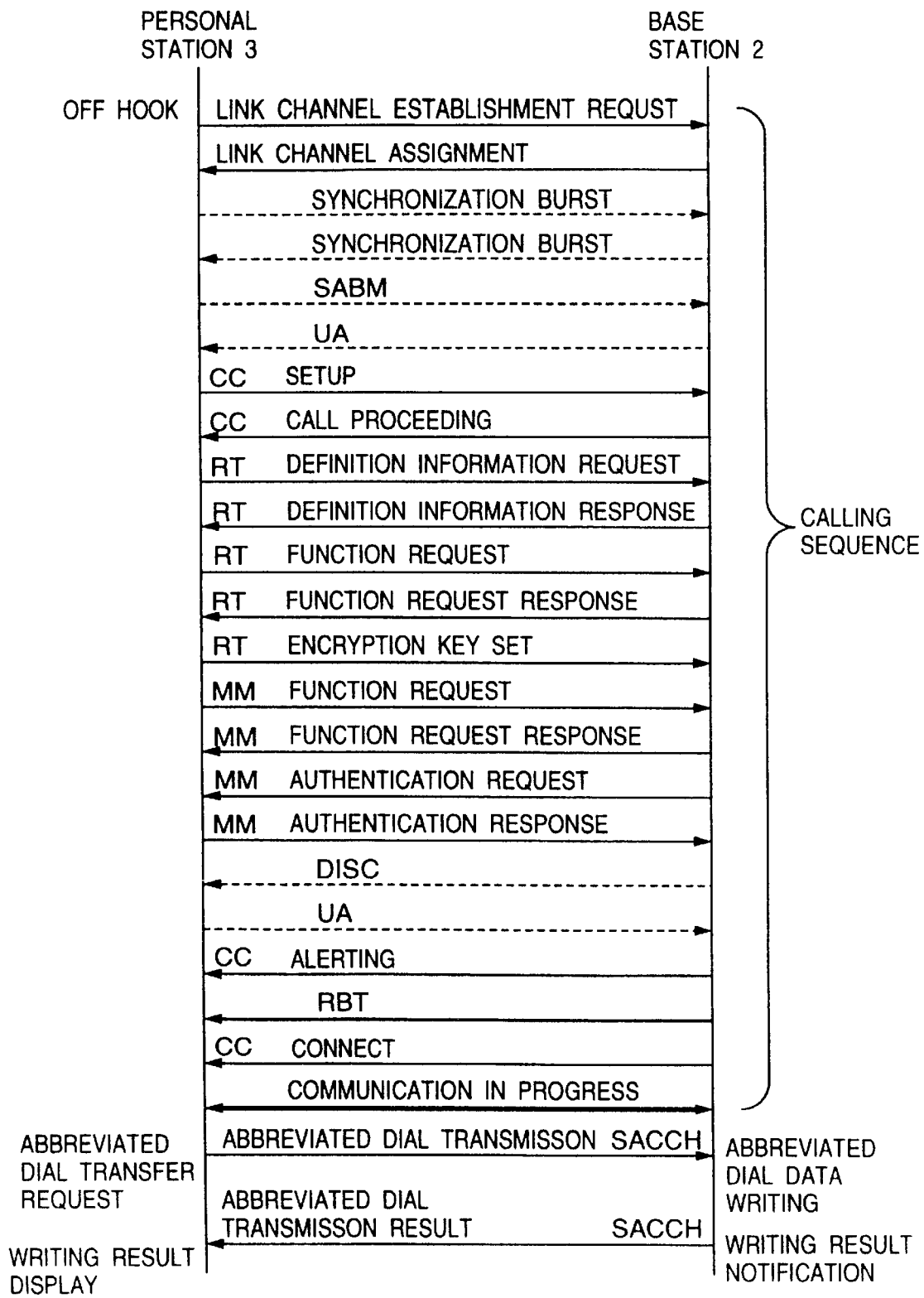
FIG. 5 is a diagram showing a calling sequence.

First of all, the method for transferring abbreviated dial data by using an empty channel of communication in progress will now be described. FIG. 5 shows a calling sequence. If the personal station 3 turns off the hook, a calling sequence determined by RCR STD-28 is executed between the personal station 3 and the base station 2 and those stations are brought into the communication state (state of communication in progress).

In accordance with this standard, data can be transmitted by using an empty SACCH (slow associated channel) included in TCHs (traffic channels) between the base station and the personal station after the communication state has been brought about. If the operator requests the personal station 3 to effect abbreviated dial transfer, the personal station 3 transmits abbreviated dial data to the base station 2 by using the SACCH. The base station receives abbreviated data and carries out writing the abbreviated data into its own abbreviated dial registration unit. Upon writing completion, the base station 3 transmits a result of abbreviated dial transmission to the personal station 2 by using a SACCH. The personal station 2 displays the received result of writing on its own display unit.

Figure 6:
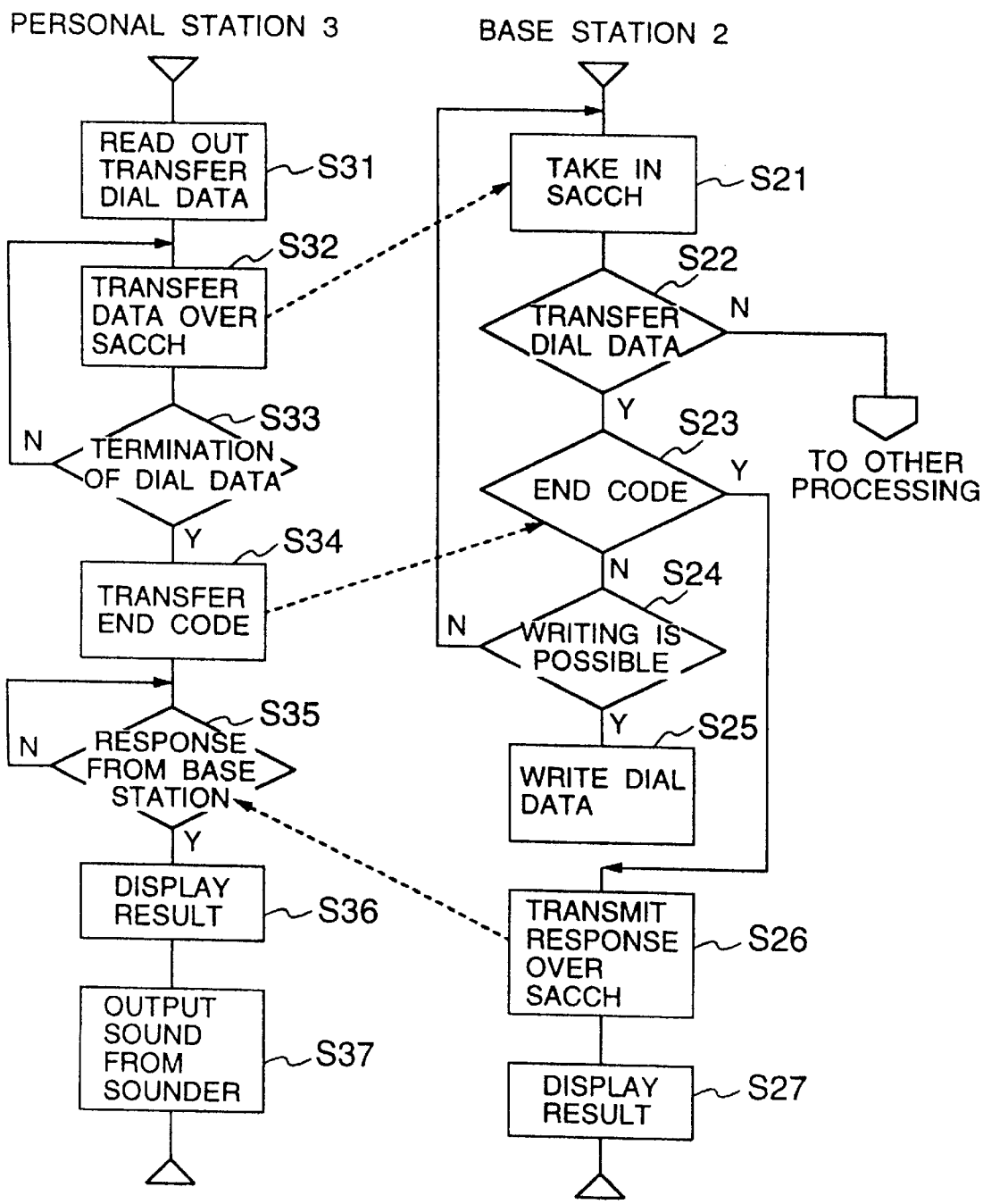
FIG. 6 is a flow chart of rewriting processing according to the present invention.

FIG. 6 shows the flow chart of transfer processing of the abbreviated dial data in the base station 2 and the personal station 3. In the case where abbreviated data are to be transferred from the personal station 3 to the base station 2, user A of the personal station 3 makes a telephone call to the base station 2 and user B of the base station 2 responds to the call, a talk between the personal station 3 and the base station 2 being thus made. The user A orders transfer of abbreviated dial data by inputting a predetermined code indicating abbreviated dial transfer, such as #+11 +transfer start abbreviated number+transfer end abbreviated number +##, via the keypad 31 of the personal station 3. The inputted code is taken in via the interface unit 36. In accordance with this inputted code, the control unit 33 effects control so that the abbreviated dial transfer unit 34 will take out transfer data from the abbreviated dial registration unit 32 (S31). Furthermore, the control unit 33 merges speech data supplied from the baseband unit 38 with abbreviated dial data (transfer data) to produce the TCH. Abbreviated dial data are transferred from a wireless unit 37 via a SACCH included in the TCH (S32). The control unit 33 effects transfer control of the SACCH until the dial data is finished (S33). Upon termination of the abbreviated dial data, an end code is transferred (S34).

FIGS. 7A, 7B, 7C and 7D show formats of relevant data.

Figures 7A, 7B:
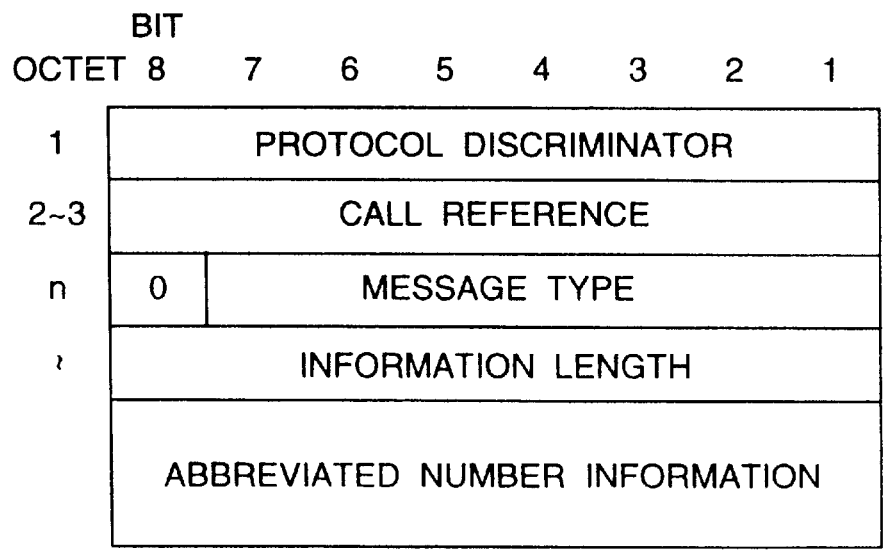
FIG. 7A is a format diagram of TCH (Traffic Channel)
FIG. 7B is a format diagram of a message.

FIG. 7A shows the format of the TCH. The SACCH included in the TCH is used to transfer abbreviated dial data. FIG. 7B shows a message format of the case where information of abbreviated dial data is sent as layer 3 information of the SACCH. The control unit 33 encodes information in the form of message type, information length, and abbreviated number information included in the message format. As the message type, "11," for example, is assigned to "abbreviated dial data transmission." The information length indicates the length of abbreviated number information. The abbreviated number information indicates abbreviated dial data. The abbreviated dial data is formed by abbreviated numbers each inputted by the user via the keyboard 31 and sandwiched between a transfer start abbreviated number and a transfer end abbreviated number, telephone numbers corresponding to respective abbreviated numbers, and a start code and an end code added to the beginning and the end of all of those data. FIG. 7C shows an example obtained when abbreviated dial data of an abreviated number 00 is coded by using ASCII codes. FIG. 7D shows an example obtained when the same abbreviated dial data is coded by using BCD codes.

The transfer rate of the SACCH is 3.2 kbps, whereas the transfer rate of the layer 3 information is 1.6 kbps. In the case where abbreviated dial data relating to 100 abbreviated numbers are to be coded by using BCD codes and transferred, the information content thereof is calculated as follows:

Start code+(abbreviated number+telephone number)×100+ end code =8 bits +48 bits ×100 +8 bits 4.8 Kbits Therefore, it takes approximately four seconds to transfer the above described data.

Referring back to FIG. 6, in the base station 2, the control unit 23 separates speech data and the SACCH from the data TCH transmitted from the personal station 3 and received by the wireless unit 27 and takes in the SACCH (S21). Then the control unit 23 determines on the basis of the message type whether the transferred data is transfer dial data (S22). When the transferred data is not transfer dial data, other processing is conducted. When the transferred data is transfer dial data, it is determined whether the end code has been received (S23). Unless terminated, it is determined whether data is that allowed to be written (S24). The abbreviated dial transfer unit 24 collates received abbreviated dial data with its own abbreviated dial data and rewrites abbreviated dial data corresponding to an unregistered number or a writable number of the abbreviated dial registration unit 22 (S25). Upon completion of rewriting the received abbreviated dial data, the base station 2 transmits a message, such as "data has been written", "rewriting is partially impossible", "writing is impossible" to the personal station 3 via the SACCH of the TCH in the same way as the operation in the personal station 3 depending upon the processing contents (S26). In addition, the base station 2 displays this message on its own display unit 25 (S27). The personal station 3 determines whether there is a response from the base station (S35) and displays the received message on the display unit 35 (S36). In addition, the personal station 3 outputs a sound corresponding to the writing result from the sounder 39c (S37). By using the channel in communication, it thus becomes possible to transfer abbreviated dial data and confirm the result of transfer.

At the time of response transmission as well, the SACCH of the TCH is used and information is coded in accordance with the message format shown in FIG. 7B. As the message type, "12," for example, is assigned to "response transmission." The result of rewriting processing of abbreviated dial data is coded to fill the area of the abbreviated number information.

In the case where all rewriting operations have resulted in success, the area is filled with "01" taking the form of BCD code. In the case where some numbers cannot be rewritten, the area is filled with "02" and thereafter the number of cases for which rewriting was impossible and abbreviated numbers for which rewriting was impossible. These codes correspond to the message displayed on the display unit and the sounder output.

Heretofore, the case where abbreviated dial data is transferred from the personal station 3 to the base station 2 has been described. In the same way, however, it is also possible to transfer abbreviated dial data during talking from the base station 2 to the personal station 3 and between the personal station 3 and the personal station 4.

Transfer of abbreviated dial data using a control channel in the standby status, i.e., in the status allowing both calling and calling incoming will now be described. According to RCR-28, there is provided an uplink (from personal station to base station)/ downlink (from base station to personal station) USCCH (user specific control channel) which can be freely defined and used as a control channel in the standby status.

The base station 2 in the standby status transmits BCCH (broadcast control channel), SCH (service channel), PCH (paging channel) or USCCH to the personal station 3 in the standby status. In the case where abbreviated dial data is to be transferred in the standby status, however, the abbreviated dial data is carried by the USCCH.

Figure 8A:
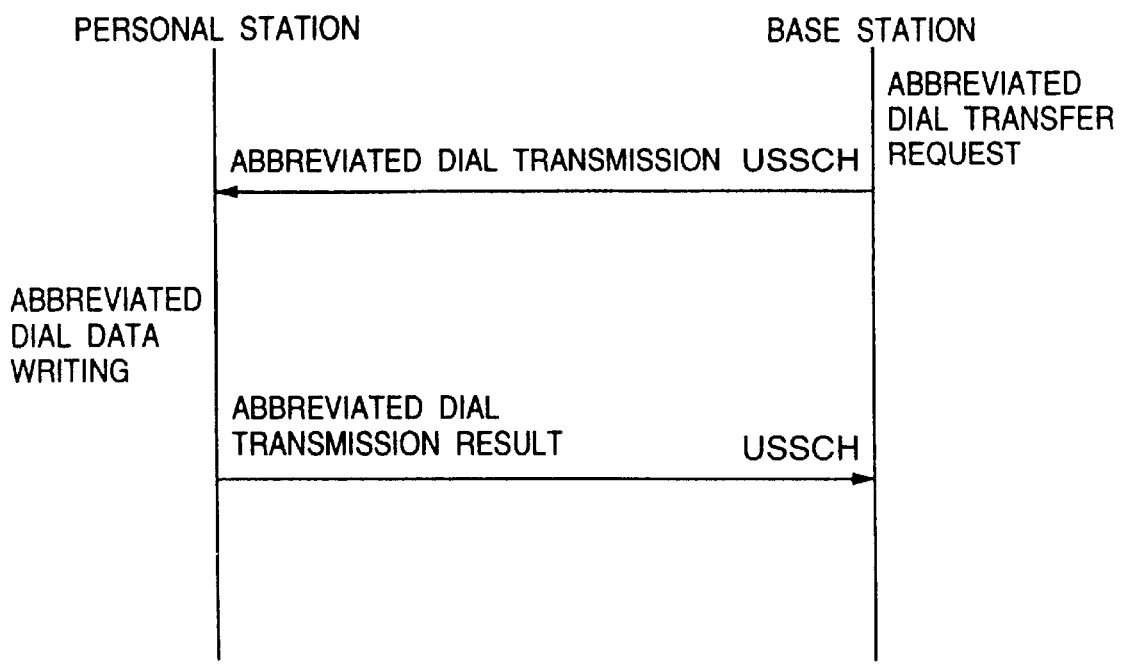
FIGS. 8A and 8B are sequence diagrams in the case where abbreviated dial data transmission is effected in the standby status.
Figure 8B:
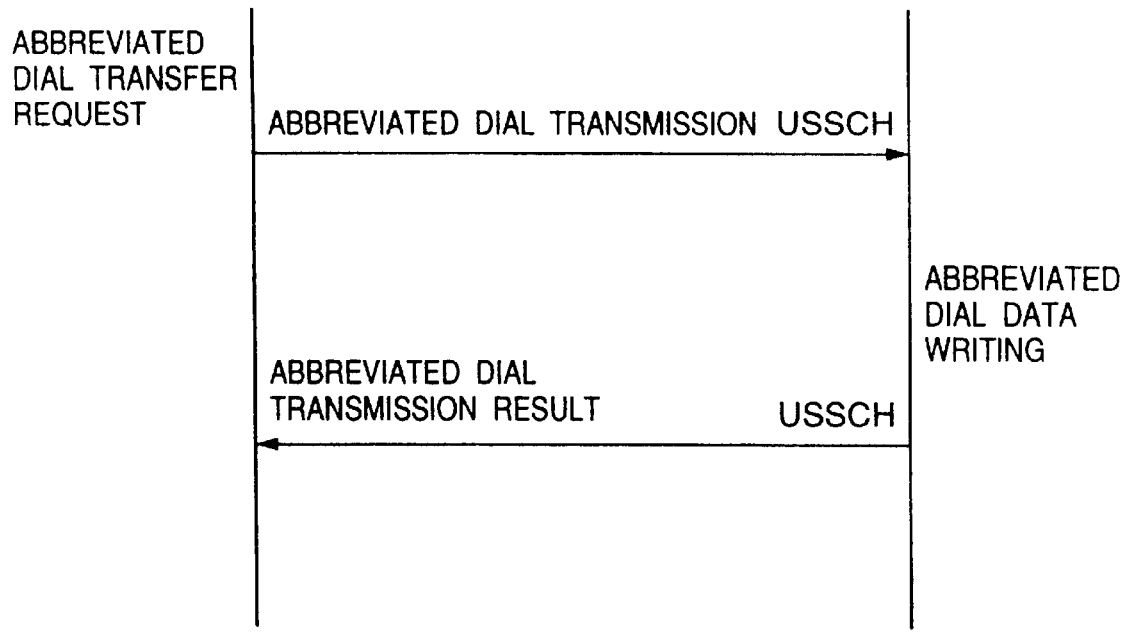

FIGS. 8A and 8B are sequence diagrams in the standby state. FIG. 8A shows transfer of abbreviated dial data from the base station to a personal station. FIG. 8B shows transfer of abbreviated dial data from a personal station to the base station. In transfer from the base station to a personal station, the base station first transfers abbreviated dial data to the personal station by using the USCCH in response to a command input of the user and the personal station takes out the abbreviated dial data and writes the data into the abbreviated dial data registration unit. The personal station transmits the result to the base station by using the USCCH and the registration operation is finished. These operations are conducted in the same way as the data transfer in communication in progress. In transfer of abbreviated dial data from a personal station to the base station, the personal station first transfers abbreviated dial data to the base station by using the USCCH and the base station takes out the abbreviated dial data and writes the data into the abbreviated dial data registration unit. The base station transmits the result to the personal station by using the USCCH and the registration operation is finished.

FIGS. 9A and 9B show formats of relevant data. FIG. 9A shows the slot structure of an uplink USCCH, whereas FIG. 9B shows the structure of a downlink USCCH. In transfer of abbreviated dial data using the USCCH, data of (62+34) bits can be transferred per slot.

The USCCH is formed by the message type, information length and abbreviated number information. The contents thereof are the same as those of information transmitted via the SACCH at the time of both transmission of abbreviated dial data and transmission of the response.

Making a comparison between the case where an empty channel of communication in progress is used and the case where a USCCH in the standby status is used, they are different in channel in use, but they are identical in method for producing data to be carried by the channel and in method for processing after necessary data has been taken out from the channel. In other words, processing other than S32, S21 and S26 shown in FIG. 6 is common to them.

Heretofore, the case where abbreviated dial data is transferred from the base station to the personal station has been described. However, transfer from the personal station to the base station and simultaneous transfer from the base station to a plurality of personal stations can also be effected in the same way.

In transfer in the standby status, abbreviated dial transfer is effected according to user's command input. The command is inputted via the keyboard in the on-hook state. The command has a format of #+11 +id +transfer start abbreviated number+transfer end abbreviated number+##, for example. The "id" is an identification number of a telephone station of transfer destination. For example, "id" is "00" for the base station, "01"–"05" for personal stations, and "99" for all of the personal stations.

In transfer in the standby status, transfer processing is executed when the user has ordered transfer in the base station or a personal station as described above. Besides, transfer processing of dial data may be conducted automatically when registration or amendment of abbreviated dial has been performed.

Figure 10:
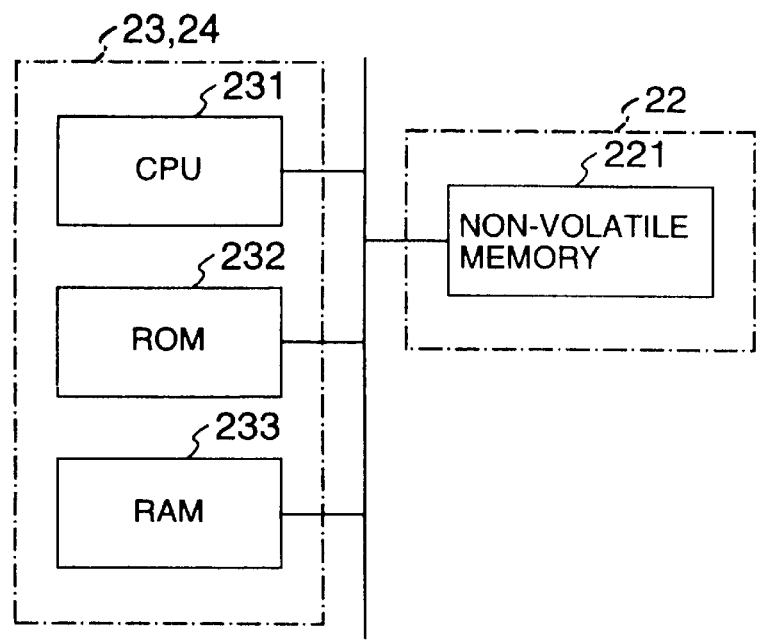
FIG. 10 is a block diagram showing a principal part of the configuration of a telecommunication device according to the present invention.

Structures of portions representing features of the present invention, i.e., the abbreviated dial transfer unit, the abbreviated dial registration unit and the control unit will now be described by taking the case of the base station as an example and referring to FIG. 10. In the case of a personal station as well, similar structures may be adopted. To be concrete, each of the abbreviated dial transfer unit 24 and the control unit 23 is formed by a CPU 231 such as a microprocessor, a ROM 232, and an RAM 233. The CPU 231 executes a control program stored beforehand in the ROM 232. Thus the CPU 231 performs reading/writing for a non-volatile memory 221, forms a judgment as to whether reading and writing are appropriate, and effects transfer of abbreviated dial data.

Figure 11:
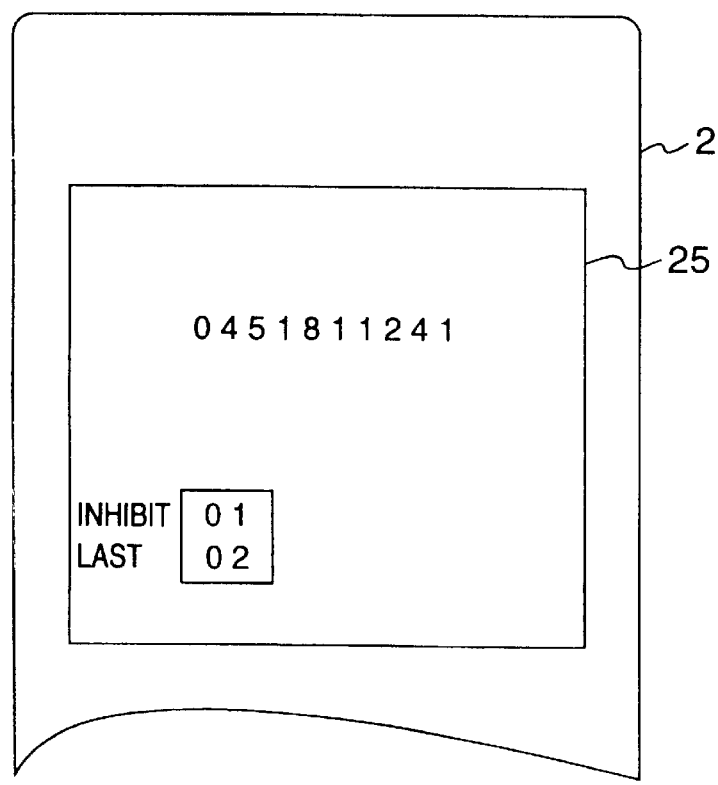
FIG. 11 is a diagram showing an example display in a display unit of a telecommunication device according to the present invention.

Rewriting of data set previously so as to be inhibited from being rewritten will now be described. As for data set previously so as to be inhibited from being rewritten as represented by abbreviated numbers 01 and 02 of FIG. 4, transferred new data cannot be written. Therefore, it becomes necessary to notify the transmission source of abbreviated numbers for which writing is impossible. Accordingly, the receiving side notifies the transfer source of abbreviated numbers or telephone numbers set previously so as to be inhibited from being rewritten and the last registration number, and urges the transfer source to newly register the telephone numbers so as to be associated with empty abbreviated numbers. An example thereof is shown in FIG. 11. FIG. 11 shows the display state in the display unit 25 of the transfer source. On the display unit 25, a telephone number to be registered, an abbreviated number for which writing is inhibited, and the last registered abbreviated number are displayed. Thereby, a telephone number is registered for a new abbreviated number in the transfer source, and it is transferred to the transfer destination and registered. In all telecommunication devices, common data can be provided with the same abbreviated number.

When in transfer of abbreviated dial data there has been a response indicating that writing is impossible, it is also possible to automatically avoid the abbreviated number for which writing is impossible and instead register the data so as to be associated with an empty abbreviated number of both the transfer source and transfer destination. In this case, there is a drawback that registration contents of abbreviated numbers are freely changed. However, "registration content confirming number display" function using the display unit may be provided so that the contents of an abbreviated number will be confirmed. Or output means such as facsimile may be connected to output an abbreviated registration number list onto paper.

Heretofore, the cordless telephone system conforming to RCR STD-28 has been described. Even in digital cordless telephone systems conforming to other typical standards, however, the same function can be realized by using channels having like functions.

Further, personal handy-phone systems (PHS) also conform to RCR STD-28. Therefore, the present invention can be used for data transfer between PHS telephone stations as well.

We claim:

1. A cordless telephone system including a base station connected to a communication line and at least one personal station connected in radio to said base station, each of said base station and said personal station comprising:

an abbreviated dial memory for storing abbreviated dial data each including an abbreviated number and a telephone number corresponding to the abbreviated number;

means for selectively performing wireless transmission of said abbreviated dial data stored in said abbreviated dial memory to another station;

means for receiving abbreviated dial data transmitted in radio from another station and writing the abbreviated data into said abbreviated dial memory by using an empty channel of communication in progress between a transmitting station and a receiving station or a control channel in a standby status of a transmitting station and a receiving station, wherein the empty channel is separated from a channel for voice transmission.

2. The cordless telephone system according to claim 1, wherein the empty channel of communication in progress is a slow associated channel (SACCH) included in a traffic channel (TCH) according to a personal handy-phone system RCR standard (RCR STD-28), Version 1.

3. The cordless telephone system according to claim 1, wherein a control channel in a standby status is a user specified control channel according to a personal handy-phone system (RCR STD-28), Version 1.

4. In a cordless telephone system including a base station connected to a communication line and at least one personal station connected in radio to said base station, a method for transmitting, between stations, abbreviated dial data each including an abbreviated number and a telephone number corresponding to the abbreviated number, comprising the steps of:

providing, in each station, an abbreviated dial memory for storing abbreviated dial data;

producing transmission abbreviated dial data read from said abbreviated dial memory according to a user's order;

performing wireless transmission of the abbreviated dial data via an empty channel in the case of communication in progress between a station of transmission source and a station of transmission destination, and performing wireless transmission of transmission abbreviated dial data via a control channel in the case where a station of transmission source and a station of transmission destination are in standby status;

writing the abbreviated dial data received by the station of transmission destination into the abbreviated dial memory and transmitting a result of writing to the station of transmission source in the same way as abbreviated dial data transmission; and notifying the user of said result of writing by using a display in each of the station of transmission source and the station of transmission destination.

* * * * *